United States Patent
Hsu et al.

(10) Patent No.: US 12,445,044 B2
(45) Date of Patent: Oct. 14, 2025

(54) TWO-WAY AC POWER CONVERSION DEVICE

(71) Applicants: Yu Hsu, Taoyuan (TW); Guei-Cheng Hu, Taoyuan (TW)

(72) Inventors: Yu Hsu, Taoyuan (TW); Guei-Cheng Hu, Taoyuan (TW)

(73) Assignee: Chroma ATE Inc., Taoyuan (TW)

( * ) Notice: Subject to any disclaimer, the term of this patent is extended or adjusted under 35 U.S.C. 154(b) by 216 days.

(21) Appl. No.: 18/232,406

(22) Filed: Aug. 10, 2023

(65) Prior Publication Data

US 2025/0055383 A1 Feb. 13, 2025

(51) Int. Cl.
*H02M 1/32* (2007.01)

(52) U.S. Cl.
CPC ..................... *H02M 1/32* (2013.01)

(58) Field of Classification Search
CPC ....................................... H02M 1/32
See application file for complete search history.

(56) References Cited

U.S. PATENT DOCUMENTS

| | | | | |
|---|---|---|---|---|
| 2007/0177325 A1* | 8/2007 | Zandonella Balco | . | H02H 3/335 361/118 |
| 2013/0155563 A1* | 6/2013 | Huang | ............... | H01R 13/7135 361/93.1 |
| 2017/0084414 A1* | 3/2017 | Rozman | .................. | H01H 83/02 |
| 2024/0088828 A1* | 3/2024 | Chen | ....................... | H02J 3/381 |

* cited by examiner

*Primary Examiner* — Alex Torres-Rivera

(57) ABSTRACT

The present invention provides a two-way AC power conversion device configured to input or output a first AC power. The two-way AC power conversion device comprises a digital control module and a power conversion module. The digital control module generates a control signal. The power conversion module sets the first AC power to be input or output according to the control signal. Wherein when the digital control module determines a real-time voltage signal of the first AC power is abnormal, the power conversion module switches to provide a ground voltage according to the control signal.

7 Claims, 3 Drawing Sheets

TWO-WAY AC POWER CONVERSION DEVICE

BACKGROUND OF THE INVENTION

Cross Reference to Related Application

The present application claims priority to Taiwan patent application Serial No. 111130139 filed on Aug. 11, 2022 the entire content of which is incorporated by reference to this application.

1. FIELD OF THE INVENTION

The present invention pertains to a two-way AC power conversion device, more specifically to a two-way AC power conversion device that can disconnect the component under test at any time.

2. Description of the Prior Art

Traditionally, when using an AC power conversion device to deal with a load current of a DUT, device under test, it is necessary to adjust the load current of the AC power conversion device to zero before safely disconnecting the DUT from the AC power conversion device. If the DUT is disconnected from the AC power conversion device without warning, it often triggers a protection mechanism of the AC power conversion device, that prevents the AC power conversion device from resuming its previous operation within a short period of time. In one example, if the DUT is disconnected from the output of the AC power conversion device without warning, the AC power conversion device cannot immediately determine that the DUT has been disconnected from the output, and the AC power conversion device will continue to pull the load current to the already open-circuited output. At this point, the output of the AC power conversion device may be subjected to abnormally high voltage. In general, the traditional AC power conversion device will directly trigger a protection mechanism to avoid damage to the AC power conversion device.

After the protection mechanism of traditional AC power conversion device is triggered, although the current path between the output and the DUT can be quickly disconnected, the residual energy in the current path cannot be released immediately. In general, the traditional AC power conversion device can only wait for a considerable amount of time that its internal circuits might slowly self-consume the residual energy. In practice, even if the DUT is reconnected to the output of the AC power conversion device, the AC power conversion device still cannot resume its operation, such as drawing current from the DUT, before the residual energy is consumed. Therefore, the industry needs a new AC power conversion device that can quickly release the residual energy when the DUT is disconnected, so that when the DUT is reconnected to the output, it can quickly resume the operation of drawing current from the DUT, increasing the flexibility to adjust the DUT at any time.

SUMMARY OF THE INVENTION

The present invention provides a two-way AC power conversion device. When the DUT is disconnected from the output end of the two-way AC power conversion device without warning, the two-way AC power conversion device can not only detect the disconnection immediately, but also can quickly release the residual energy in the current path.

The present invention provides a two-way AC power conversion device configured to input or output a first AC power. The two-way AC power conversion device comprises a digital control module and a power conversion module. The digital control module generates a control signal. The power conversion module sets the first AC power to be input or output according to the control signal. Wherein when the digital control module determines a real-time voltage signal of the first AC power is abnormal, the power conversion module switches to provide a ground voltage according to the control signal.

In some embodiments, when the digital control module determines the real-time voltage signal is abnormal, the digital control module further detects a residual current, received by the power conversion module, to set the control signal corresponding to the residual current. Besides, an output end of the power conversion module receives the residual current, and when the residual current is greater than a current preset value, the control signal instructs the power conversion module to maintain the provided ground voltage. When the residual current is not greater than the current preset value, the control signal instructs the power conversion module to stop providing the ground voltage, and sets a duty cycle of the power conversion module to zero.

In some embodiments, the digital control module comprises a phase-locked loop and a control unit, the phase-locked loop detects the first AC power to be input or output and generates the real-time voltage signal, the real-time voltage signal has an amplitude component and an angular velocity component, the control unit sets the control signal according to the amplitude component and at least one amplitude variation obtained from different switching cycles. Besides, the control unit obtains the amplitude variation of each switching cycle in the plurality of consecutive switching cycles, and when the amplitude variation of each switching cycle in the consecutive switching cycles are all greater than a first threshold value, the control unit determines the amplitude variation of each switching cycle is abnormal. In addition, the control unit determines the amplitude component of each switching cycle in a plurality of consecutive switching cycles, and when the amplitude component of each switching cycle in the consecutive switching cycles are not greater than a second threshold value, the control unit determines the amplitude component of each switching cycle is abnormal.

In summary, the two-way AC power conversion device proposed by the present invention uses the phase-locked loop to lock the input or output the first AC power, and determines whether the DUT is disconnected from the output end by the amplitude component of the real-time voltage signal. When the DUT is disconnected from the output end without warning, the two-way AC power conversion device can not only detect and stop inputting or outputting AC power immediately, but also effectively release the residual energy in the current path. When the DUT is reconnected to the output end, the two-way AC power conversion device can quickly resume work.

BRIEF DESCRIPTION OF THE APPTERMINALED DRAWINGS

DETAILED DESCRIPTION OF THE INVENTION

The features, targetions, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
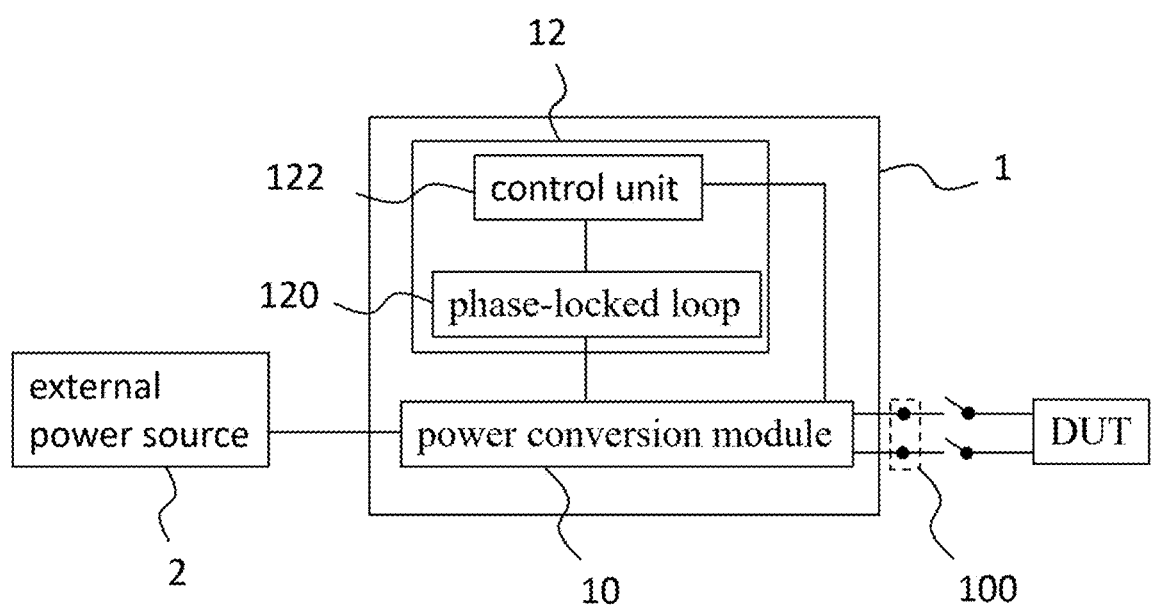
FIG. 1 illustrates a block diagram of a two-way AC power conversion device according to an embodiment of the present invention.

Please refer to FIG. 1, FIG. 1 illustrates a block diagram of a two-way AC power conversion device according to an embodiment of the present invention. As shown in FIG. 1, the two-way AC power conversion device 1 is electrically connected between an external power source 2 and a device under test (DUT), for transmitting AC power (a first AC power) with the DUT. In practice, the external power source 2 can be the utility power or other voltage sources, and the DUT, applied to the two-way AC power conversion device 1, can be, not limited to, a load or a voltage source. In an example, when the DUT is the load, the two-way AC power conversion device 1 can provide power to drive the DUT. And when the DUT is the voltage source, the two-way AC power conversion device 1 can draw power from the DUT, so that the AC power provided by the DUT can be fed back to the external power source 2. That is, the two-way AC power conversion device 1 does not limit the direction of transmission of the AC power, and the AC power can be input or output by the two-way AC power conversion device 1.

The two-way AC power conversion device 1 comprises a power conversion module 10 and a digital control module 12, and the digital control module 12 comprises a phase-locked loop 120 and a control unit 122. The power conversion module 10 has an output end 100, and the output end 100 is used to electrically connect to the DUT. In an example, the output end 100 and the DUT can be connected via a bus. In addition, the control unit 122 can be electrically connected to the phase-locked loop 120 and the power conversion module 10 respectively, and the control unit 122 can generate a control signal to set the first AC power to be input or output by the power conversion module 10. The control signal can be a pulse width modulation (PWM) signal, and the control unit 122 can set various parameters of the AC voltage or AC current output by the power conversion module 10 by determining the duty ratio in a duty cycle of the PWM signal.

In practice, a phase detector can be installed in the phase-locked loop 120. When the output end 100 and the DUT are connected, the phase detector should be able to lock the AC voltage or AC current transmitted between the power conversion module 10 and the DUT. For example, assuming that the power conversion module 10 draws power from the DUT, when the phase detector locks on to the AC voltage, the phase-locked loop 120 can generate a real-time voltage signal based on the locked AC voltage. In an example, the real-time voltage signal generated by the phase-locked loop 120 can be used as a means to determine whether the DUT is working properly. That is, when the phase detector successfully locks on to the AC voltage (generates the real-time voltage signal), the control unit 122 can determine that the DUT has been installed at this time. In addition, the phase-locked loop 120 can perform Park transformation on the real-time voltage signal to obtain an amplitude component and an angular velocity component of the real-time voltage signal. Person having ordinary skill in the art should be able to understand how the phase-locked loop 120 works, and this embodiment will not elaborate here. In an example, the phase-locked loop 120 can obtain the corresponding real-time voltage signal in each switching cycle, so that the control unit 122 can calculate difference between two amplitude components according to the real-time voltage signal within two adjacent switching cycles. Said difference can be regarded as an amplitude variation. In practice, the control unit 122 can record corresponding (N−1) amplitude variations according to the real-time voltage signal within consecutive N switching cycles, and can set the control signal according to the (N−1) amplitude variations.

Figure 2:
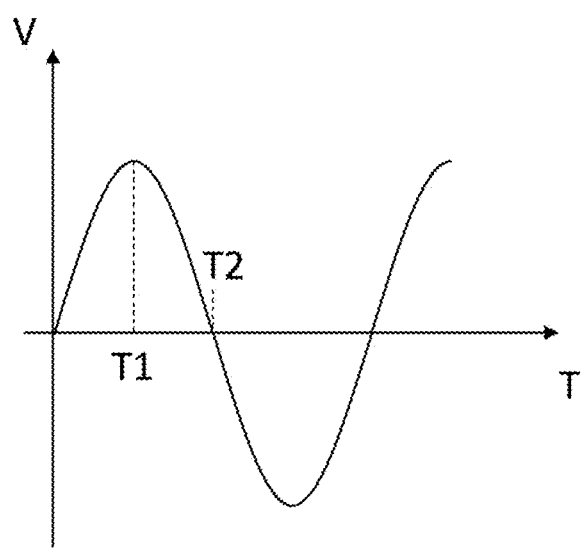
FIG. 2 illustrates a schematic diagram of an AC voltage.

In an example, assuming that the power conversion module 10 is set to draw power from the DUT. If a connection line between the output end 100 and the DUT suddenly breaks, that might cause the DUT to be disconnected from the output end 100 without warning. Since the two-way AC power conversion device 1 and the DUT is transmitting the AC power, when the DUT is disconnected from the output end 100 without warning, there can be two situations that the AC voltage may be close to peak voltage or close to zero voltage. The following will use these two situations as examples to demonstrate how the two-way AC power conversion device handles them. Please also refer to FIG. 1 and FIG. 2 together, FIG. 2 illustrates a schematic diagram of an AC voltage. As shown in figures, assuming that the DUT cuts off, from the output end 100, at time T1, the AC voltage is close to its peak value. At this time, the control unit can obtain from the real-time voltage signal, especially from its previous switching cycle and its current switching cycle, knowing that the amplitude variation increases abnormally, such as the AC voltage quickly decaying from its peak value and causing the amplitude variation to be greater than a preset first threshold value. In practice, after the control unit determines that the amplitude variation is abnormal, it will quickly adjust the control signal, thereby instructing the power conversion module 10 to stop providing the AC power.

This embodiment does not limit the exact value of the first threshold value, and person having ordinary skill in the art can understand that the first threshold value can be determined based on the predetermined value of the AC voltage. On the other hand, the control unit 122 does not necessarily adjust the control signal immediately when only one amplitude variation is abnormal. The control unit 122 can also determine whether the amplitude variation is abnormal in multiple adjacent switching cycles of the real-time voltage signal. For example, when the control unit 122 knows that at least six consecutive amplitude variations are greater than the preset first threshold value, it can determine that the DUT has been disconnected from the output end 100.

In an example, assuming that the DUT is disconnected from the output end 100 at time T2, since the AC voltage at time T2 is close to zero, the current input or output by the output end 100 is also close to zero. It is almost impossible for the traditional AC power conversion device to immediately determine whether the DUT is disconnected, which can easily lead to misjudgment. In particular, the traditional AC power conversion device uses digital means to measure the current, which can be affected by errors such as noise interference, making it difficult to determine whether the small current values detected around the current zero point are actually zero. In other words, when the DUT is disconnected around the current zero point, the traditional AC power conversion device will not be able to trigger the protection mechanism immediately. In contrast, the amplitude component of this embodiment is a value that has been separated from the angular velocity component (phase) by Park transformation, so that the control unit 122 can quickly see whether the amplitude component of the AC voltage has changed. Based on this, when the DUT is disconnected from the output end 100 at time T2, the control unit 122 can also determine whether an abnormality occurs by the amplitude variation and quickly adjust the control signal, thereby instructing the power conversion module 10 to no longer continue to provide AC power.

We can tell abnormal situation by using amplitude variation when the AC voltage input or output by the power conversion module 10 changes greatly. If the AC voltage input or output by the power conversion module 10 does not change that much, the control unit 122 can determine whether the DUT is disconnected by the amplitude component. In an example, since the peak value of the AC voltage input or output by the power conversion module 10 is already known, we can set a threshold value (second threshold value) by referring to the peak value. In practice, the second threshold value does not necessarily equal the peak value but may be, but not limited to, slightly smaller than the peak value. In an example, assuming that the power conversion module 10 is set to draw power from the DUT, and the phase detector of the phase-locked loop 120 has locked the real-time voltage signal and obtained the amplitude component and the angular velocity component. At this time, the control unit 122 can determine whether the DUT is disconnected by one or more amplitude components being lower than the second threshold value. For example, the control unit 122 may record the amplitude components of the consecutive switching cycles. When the amplitude components of the consecutive switching cycles are all smaller than the second threshold value, the control unit 122 can determine that the DUT has been disconnected. As mentioned above, the amplitude component of this embodiment is a value that has been separated from the angular velocity component (phase) by Park transformation, so that even if the AC voltage changes little, the control unit 122 can quickly determine whether the DUT is disconnected.

Figure 3:
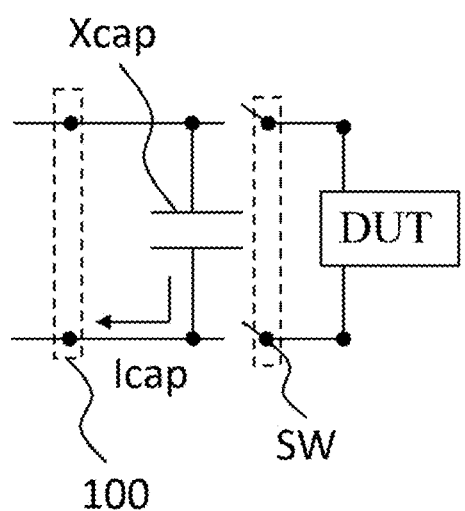
FIG. 3 is a schematic diagram of a circuit between the output end and the DUT according to an embodiment of present invention.

It is worth mentioning that since the output end 100 usually has a capacitor (for example, bridged between two terminals), this embodiment also designs a mechanism for releasing electric energy in the capacitor. Please also refer to FIG. 1 to FIG. 3, FIG. 3 is a schematic diagram of a circuit between the output end and the DUT according to an embodiment of present invention. As shown in figures, a capacitor Xcap can be installed at the output end 100. The capacitor Xcap may not be intentionally designed in the current path, for example the capacitor Xcap may be non-ideal capacitance between the output end 100 and the DUT. The following will explain the impact of the capacitor Xcap on the two-way AC power conversion device.

In an example, assuming that the power conversion module 10 draws power from the DUT, the capacitor Xcap will keep storing electric energy. At this time, when the DUT is disconnected (FIG. 3 uses switch SW to indicate open circuit), person having ordinary skill in the art can understand that there is still considerable residual energy in the capacitor Xcap, thereby continuously releasing a residual current Icap. This embodiment does not limit size of the capacitor Xcap and the release direction of the residual current Icap. In general, the residual current Icap can be consumed by impedance inside circuit components, but it usually takes longer time. In order to speed up the release of the residual energy in the capacitor Xcap, when the control unit 122 determines that the DUT is disconnected, the control unit 122 will control the power conversion module 10 to provide ground voltage (or zero voltage) for a period of time. In an example, since the power conversion module 10 actively controls the output end at ground voltage, there should have a voltage difference between the capacitor Xcap and the output end 100 that the capacitor Xcap can release the residual current Icap more efficiently (that is, a larger residual current Icap can be provided).

In practice, the control unit 122 will continue to monitor the value of the residual current Icap fed into the output end 100. When the value of the residual current Icap is greater than a preset current value, it means that the residual energy in the capacitor Xcap has not been released completely yet, then the control signal provided by the control unit 122 continues to instruct the power conversion module 10 to provide ground voltage. On contrary, when the value of the residual current Icap is not greater than the preset current value, it means that the residual energy in the capacitor Xcap has been completely or almost released, then the control signal provided by the control unit 122 instructs the power conversion module 10 to stop providing ground voltage. And the control unit 122 can adjust the control signal to set duty ratio to zero, so that the power conversion module 10 does not input or output first AC power and wait for restart command.

As can be seen from above, when the DUT is disconnected from the output end 100 without warning, the two-way AC power conversion device of this embodiment can reduce interference of the phase, since the control unit 122 is based on the real-time voltage signal generated by the phase-locked loop 120 locking the AC voltage. Therefore, the control unit 122 can control the power conversion module 10 to stop providing the AC power and avoid the rise of voltage due to disconnection of the DUT. Meanwhile, the power conversion module 10 can also maintain ground voltage at the output end 100 to quickly release the residual energy in the capacitor Xcap. In this way, the two-way AC power conversion device 1 will not trigger the protection mechanism due to the abnormally high voltage of the output end 100, and because the energy stored in the capacitor Xcap has been quickly released, the two-way AC power conversion device 1 can quickly return to work when the DUT is reconnected to the output end 100.

It is worth mentioning that although the above is based on the power conversion module 10 draw power from the DUT as an example, in fact, the foregoing embodiment can also be applied to the power conversion module 10 supplying power to the DUT. That is, the control unit 122 determines whether the amplitude variation is greater than the first threshold value, determines the amplitude component is less than the second threshold value, determines the duty ratio of the power conversion module 10 is greater than the third threshold value, and other abnormal situations are independent of the direction of power transmission. Even if the power conversion module 10 is used to supply power to the DUT, the control unit 122 can still determine whether the DUT is disconnected by the above embodiment.

In summary, the two-way AC power conversion device proposed by the present invention uses the phase-locked loop to lock the input or output the first AC power, and determines whether the DUT is disconnected from the output end by the amplitude component of the real-time voltage signal. When the DUT is disconnected from the output end without warning, the two-way AC power conversion device can not only detect and stop inputting or outputting AC power immediately, but also effectively release the residual energy in the current path. When the DUT is reconnected to the output end, the two-way AC power conversion device can quickly resume work.

What is claimed is:

1. A two-way AC power conversion device, configured to input or output a first AC power, comprising:
   a digital control module for generating a control signal; and
   a power conversion module setting the first AC power to be input or output according to the control signal;
   wherein when the digital control module determines a real-time voltage signal of the first AC power is abnormal, the power conversion module switches to provide a ground voltage according to the control signal.

2. The two-way AC power conversion device according to claim 1, wherein when the digital control module determines the real-time voltage signal is abnormal, the digital control module further detects a residual current, received by the power conversion module, to set the control signal corresponding to the residual current.

3. The two-way AC power conversion device according to claim 2, wherein an output end of the power conversion module receives the residual current, and when the residual current is greater than a current preset value, the control signal instructs the power conversion module to maintain the provided ground voltage.

4. The two-way AC power conversion device according to claim 3, wherein when the residual current is not greater than the current preset value, the control signal instructs the power conversion module to stop providing the ground voltage, and sets a duty cycle of the power conversion module to zero.

5. The two-way AC power conversion device according to claim 1, wherein the digital control module comprises a phase-locked loop and a control unit, the phase-locked loop detects the first AC power to be input or output and generates the real-time voltage signal, the real-time voltage signal has an amplitude component and an angular velocity component, the control unit sets the control signal according to the amplitude component and at least one amplitude variation obtained from different switching cycles.

6. The two-way AC power conversion device according to claim 5, wherein the control unit obtains the amplitude variation of each switching cycle in a plurality of consecutive switching cycles, and when the amplitude variation of each switching cycle in the consecutive switching cycles are all greater than a first threshold value, the control unit determines the amplitude variation of each switching cycle is abnormal.

7. The two-way AC power conversion device according to claim 6, wherein the control unit determines the amplitude component of each switching cycle in the plurality of consecutive switching cycles, and when the amplitude component of each switching cycle in the consecutive switching cycles are not greater than a second threshold value, the control unit determines the amplitude component of each switching cycle is abnormal.

* * * * *